US009986195B2

(12) United States Patent
Tanaka et al.

(10) Patent No.: US 9,986,195 B2
(45) Date of Patent: May 29, 2018

(54) METHOD AND DEVICE THAT SIMULATE VIDEO DELIVERED BY VIDEO INSTRUMENT

(71) Applicant: NEC DISPLAY SOLUTIONS, LTD., Tokyo (JP)

(72) Inventors: Komei Tanaka, Tokyo (JP); Takashi Mikuriya, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days. days.

(21) Appl. No.: 15/523,730

(22) PCT Filed: Nov. 17, 2014

(86) PCT No.: PCT/JP2014/080356
§ 371 (c)(1),
(2) Date: May 2, 2017

(87) PCT Pub. No.: WO2016/079787
PCT Pub. Date: May 26, 2016

(65) Prior Publication Data
US 2017/0318254 A1 Nov. 2, 2017

(51) Int. Cl.
*H04N 17/02* (2006.01)
*H04N 5/58* (2006.01)
*H04N 9/31* (2006.01)

(52) U.S. Cl.
CPC ............ *H04N 5/58* (2013.01); *H04N 9/3182* (2013.01); *H04N 9/3191* (2013.01)

(58) Field of Classification Search
CPC ....... H04N 5/58; H04N 9/3182; H04N 9/3191
(Continued)

(56) References Cited

U.S. PATENT DOCUMENTS 5,270,818 A * 12/1993 Ottenstein ............... H04N 5/58
315/10
5,406,305 A * 4/1995 Shimomura ......... G09G 3/3406
345/102
(Continued)

FOREIGN PATENT DOCUMENTS

JP S 61-279886 A 12/1986
JP H 05-232450 A 9/1993
(Continued)

OTHER PUBLICATIONS

International Search Report (ISR) (PCT Form PCT/ISA/210), in PCT/JP2014/080356, dated Feb. 17, 2015.
(Continued)

*Primary Examiner* — Michael Lee
(74) *Attorney, Agent, or Firm* — McGinn IP Law Group, PLLC.

(57) ABSTRACT

A method of simulating how output video from a video instrument that presents video appears under a given viewing environment includes: inputting an environmental illuminance in a viewing environment in which output video is viewed; inputting a set condition with regard to the video instrument, the set condition including at least optical output; and calculating and outputting, by using the environmental illuminance and the set condition, a video contrast based on a ratio between an illuminance of the output video and the environmental illuminance at a video formation plane on which the output video is formed.

17 Claims, 5 Drawing Sheets

(58) Field of Classification Search
USPC .......................................................... 348/177
See application file for complete search history.

(56) References Cited

U.S. PATENT DOCUMENTS

| 2003/0043165 A1* | 3/2003 | Miyachi | ............... | G09G 3/2007 |
| | | | | 345/589 |
| 2005/0179706 A1* | 8/2005 | Childers | ............. | G02F 1/13318 |
| | | | | 345/690 |

FOREIGN PATENT DOCUMENTS

| JP | 2003-295309 A | 10/2003 |
| JP | 2006-208999 A | 8/2006 |
| JP | 2009-204824 A | 9/2009 |

OTHER PUBLICATIONS

Yoichi Tamao, Adobe Illustrator CS5 Perfect Master, 1st ed., Shuwa System Co. Ltd., pp. 417-418, Aug. 8, 2010.

* cited by examiner

METHOD AND DEVICE THAT SIMULATE VIDEO DELIVERED BY VIDEO INSTRUMENT

TECHNICAL FIELD

The present invention relates to a method and a device that simulate video to be delivered by various video instruments that present video to a viewer, and particularly relates to a method and a device that simulate how output video from a video instrument appears under a predetermined environment.

BACKGROUND ART

Examples of a video instrument that presents video to a viewer include a projection-type video instrument that projects video onto a projection plane such as a screen, and a direct-view video instrument that forms, as a viewing target, video on a display surface of a video instrument without performing projection. The projection video instrument is, for example, a projector, and the direct-view video instrument is, for example, a liquid crystal display, a liquid crystal monitor, a LED (light emitting diode) screen, a plasma display, or a CRT (cathode-ray tube) monitor. Among these video instruments, the projector is suitable for presenting video to a plurality of viewers, and is used in a relatively large indoor space such as a conference room or a lecture hall, and recently, in projection mapping in which video is projected onto objects other than a screen in indoor and outdoor spaces. A large LED screen is used for presentation of video to a large audience in a large outdoor place such as a stadium.

In a case of a projection video instrument such as a projector, or a direct-view video instrument, how video delivered from the video instrument appears to a viewer depends on an environment such as a place at which the video instrument is installed. For example, in a case of a projector, video projected from the projector onto a screen depends on the brightness of a viewing environment, and the projected video has a whitish appearance to a viewer in whole in a bright viewing environment. The viewing environment is a use environment in which the video instrument is used, and in particular, the viewing environment is an environment in which video formed by the video instrument is viewed by a viewer. When the light quantity of the video projected from the projector is insufficient as compared to the brightness of the viewing environment, the viewer cannot clearly see the video. In particular, the video projected from the projector appears white in a viewing environment in which intense light such as sun light is incident, and the viewer cannot see the video as intended. The brightness of video at the projection plane changes depending on the performance of a lens that projects video onto the projection plane, the size of video at the projection plane, and the availability of a lens shift function of shifting the lens in a direction orthogonal to the optical axis of the lens that projects video, in the projector. Accordingly, whether video clearly appears to the viewer depends on factors such as the lens performance, the video size, and the availability of the lens shift function.

Since the appearance of video projected from the projector depends on the viewing environment, it is difficult to predict, in advance, how the projected video actually appears. The same argument applies to a direct-view video instrument such as a liquid crystal display or an LED screen. The appearance of video displayed by a direct-view video instrument depends on, for example, the intensity of external light in the viewing environment, but it is difficult to predict, in advance, whether the luminance of the video instrument in an assumed viewing environment is sufficient or not.

Whether video presented to a viewer has a quality enough for viewing also depends on the kind of used video and a level requested as the quality of the video by a user. Thus, whether video from a video instrument that presents video to a viewer has an enough quality for use in an environment in which the video instrument is assumed to be used has been only determined by bringing the video instrument to an actual use place, displaying video through the video instrument, and checking how the displayed video appears.

Disclosed in [PTL 1] is a system that enables appropriate selection of a projector suitable for a viewing environment from among a plurality of types of projectors having, for example, different brightness of a light source, by receiving the model name of a projector, the size of a projection screen, an arrangement of desks and chairs in a viewing area, and the like, and then outputting an optimum size of the viewing area and the availability of lighting when this model is used. However, this system is not configured to perform simulation of how video appears in an actual viewing environment, and thus whether video would appear as intended by a user cannot be checked through the system. Moreover, this system assumes that a projector is used under a particular environment such as a conference room or a classroom, and thus cannot be used in selection of a projector for usage such as projection mapping.

An example disclosing a technology of performing simulation of the appearance of video in a video instrument is [PTL 2]. Disclosed in [PTL 2] is a system that simulates video viewed through a video display device that is a glass-type device designed as a wearable device individually for each user. This system is used to determine whether a video display device used as an optical aid displays AR (augmented reality) video adapted to a visual condition of a user, and thus is not intended to simulate how differently video appears depending on difference in a viewing environment such as environmental light.

CITATION LIST

Patent Literature

[PTL 1] JP2003-295309A
[PTL 2] JP2006-208999A

SUMMARY OF INVENTION

Technical Problem

In a known system, any condition provided to a limited place, such as a conference room or a classroom, as a target is input to select a video instrument suitable for the place. However, such a system does not indicate how video actually appears due to influence of, for example, environmental light, and thus is insufficient for evaluation of how video appears to allow selection of an appropriate video instrument in accordance with a use purpose.

The present invention is intended to provide a method and a device that are capable of simulating, without bringing an actual video instrument to an actual use place, how output video from the video instrument appears under a predetermined environment.

Solution to Problem

According to an exemplary aspect of the present invention, a method of simulating how output video from a video instrument that presents video appears under a given viewing environment includes: inputting an environmental illuminance in a viewing environment in which the output video is viewed; inputting a set condition with regard to the video instrument, the set condition including at least optical output; and calculating and outputting, by using the environmental illuminance and the set condition, a video contrast based on a ratio between an illuminance of the output video and the environmental illuminance at a video formation plane on which the output video is formed.

According to another exemplary aspect of the present invention, a simulation device that simulates how output video from a video instrument that presents video appears under a given viewing environment includes: an input unit that receives an environmental illuminance in an viewing environment in which the output video is viewed and a set condition with regard to the video instrument, the set condition including at least optical output; and a video contrast calculator that calculates and outputs, by using the environmental illuminance and the set condition received by the input unit, a video contrast based on a ratio of the illuminance of the output video and the environmental illuminance at a video formation plane on which the output video is formed.

Advantageous Effect of Invention

Without bringing an actual video instrument to an actual use place, how output video from the video instrument appears under a predetermined environment can be checked by calculating and outputting a video contrast based on a ratio between the illuminance of the output video and an environmental illuminance

DESCRIPTION OF EMBODIMENTS

Figure 1:
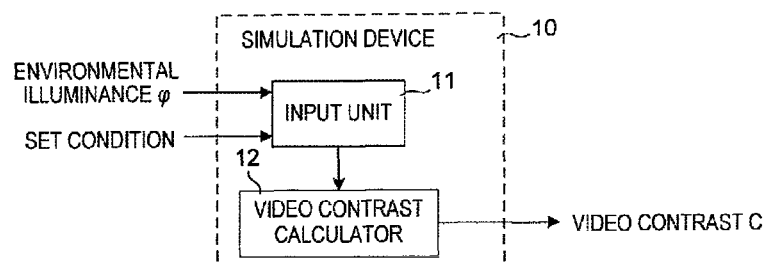
FIG. 1 is a block diagram illustrating the configuration of a simulation device according to a basic exemplary embodiment of the present invention.

Exemplary embodiments of the present invention will be described with reference to the accompanying drawings. Simulation device 10 illustrated in FIG. 1 is based on a basic exemplary embodiment of the present invention, and performs simulation of how output video from a video instrument that presents video to a viewer appears under a viewing environment given to the video instrument. Simulation device 10 includes input unit 11 that receives an environmental illuminance $\varphi$ in an assumed viewing environment and a set condition with regard to the video instrument, and video contrast calculator 12 that calculates and outputs, by using the environmental illuminance $\varphi$ and the set condition received by the input unit, video contrast C at a video formation plane on which the output video from the video instrument is to be formed.

The set condition includes at least optical output of the video instrument as a simulation target. The optical output is a value related to a luminous flux from the video instrument, for example, luminous flux specification value J, when the video instrument is of a projection type. For a projection video instrument, the set condition includes, for example, above-described video size S and flux attenuation rate F based on lens shift. Projection distance D, projection distance ratio T of lenses, and the aspect ratio of video in the projector output may be used in place of video size S. When the video instrument is of a direct-view type, the optical output is, for example, emission luminance X of the video instrument, or illuminance E converted from emission luminance X. For a direct-view video instrument, since light is directly emitted from a display surface of the video instrument, a luminous emittance needs to be used in place of the illuminance, but in the present specification, the term "illuminance" is used in the case of a direct-view video instrument to collectively handle a direct-view video instrument with a projection video instrument. The illuminance and the luminous emittance have identical dimensions as physical quantities, and identical magnitudes as numerical values. The video formation plane is a plane on which video viewed by the viewer is actually formed, and is a projection plane, for example, a screen, when the video device is a projection video device, or is a surface of the video device or a display surface when the video device is a direct-view video device.

Video contrast C is defined in the exemplary embodiment. Video contrast C is based on a ratio of an illuminance from a projection video device or an illuminance from a direct-view video device to the illuminance of environmental light in the viewing environment, at the video formation plane, and is a value with taken into account reflection of light at the video formation plane. Accordingly, video contrast C is a value representing the degree of actual appearance of output video under a given viewing environment, and thus the output video from the video instrument appears more clearly as the value of video contrast C is larger.

Figure 2:
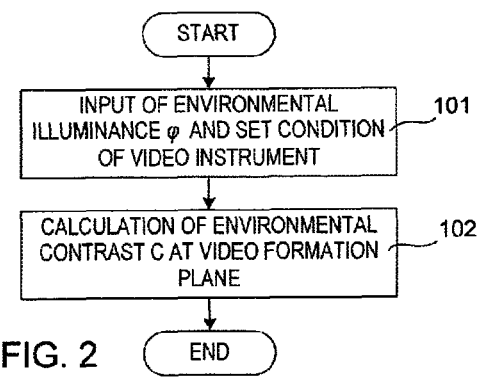
FIG. 2 is a flowchart illustrating operation of the simulation device illustrated in FIG. 1.

FIG. 2 is a flowchart illustrating the processing at simulation device 10 illustrated in FIG. 1. First at step 101, the environmental illuminance $\varphi$ in a viewing environment assumed for the video instrument and the set condition related to the video instrument are supplied to input unit 11. The set condition includes at least the optical output. Subsequently at step 102, video contrast calculator 12 calculates, by using the environmental illuminance $\varphi$ and the set condition, video contrast C based on a ratio between the illuminance of the output video and the environmental illuminance at the video formation plane on which the output video from the video instrument is to be formed. Calculated video contrast C is externally output from simulation device 10.

Without bringing an actual video instrument to an actual use place, a user can check how output video from the video instrument appears under the predetermined environment by checking the value of video contrast C.

Figure 3:
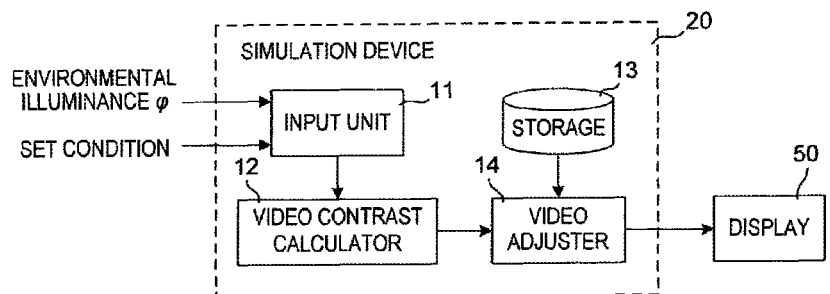
FIG. 3 is a block diagram illustrating the configuration of a simulation device according to an exemplary embodiment of the present invention.

A simulation device based on the present invention can present a simulation result in a more easily understandable format by actually displaying video. Simulation device 20 illustrated in FIG. 3 is based on an exemplary embodiment of the present invention, and simulates how output video from a video instrument that presents video appears to the viewer under a viewing environment given to the video instrument and outputs a result of the simulation as video. Simulation device 20 is connected with display 50 that displays video generated by simulation performed at simulation device 20. Display 50 is a sufficiently adjusted liquid crystal display or liquid crystal monitor installed in, for example, a favorable viewing environment with less environmental light.

When a video instrument that performs simulation of its output video is a projection video instrument, for example, a projector, simulation device 20 performs simulation of how video used for the simulation actually appears based on factors such as the luminous flux of the projector, the size of output video from the projector, and an environmental illuminance in the viewing environment in which the projector is used, and outputs a result of the simulation to display 50. In the following description, video used for simulation is also referred to as target video. The luminous flux of the projector is expressed, for example, in units of ANSI (American National Standards Institute) lumen, and the size of video is expressed as the size of the video on a screen when the video is projected onto the screen from the projector. Similarly, for a direct-view video instrument such as a liquid crystal display, a liquid crystal monitor, or an LED screen, this simulation device can perform simulation of how a target video actually appears based on factors such as the luminance of the video instrument, reflectance at the display surface of the video instrument, and an environmental illuminance, and output a result of the simulation to the display. Simulation device 20 according to the present exemplary embodiment allows a user who is planning installation of a video instrument to recognize how video from the video instrument actually appears based on how a target video is displayed without bringing the video instrument to an actual use place, thereby allowing the user to easily perform selection of a model of the video instrument, for example.

The following describes simulation device 20 illustrated in FIG. 3 in more detail.

Similarly to simulation device 10 illustrated in FIG. 1, simulation device 20 includes: input unit 11 that receives the environmental illuminance $\varphi$ and a set condition related to a video instrument in an assumed viewing environment; and video contrast calculator 12 that calculates, by using the environmental illuminance $\varphi$ and the set condition received by the input unit, video contrast C at a video formation plane on which output video from the video instrument is to be formed. Simulation device 20 additionally includes: storage 13 that stores therein data of target video used for simulation; and video adjuster 14 that reads the target video from storage 13, adjusts the contrast of the target video based on a video contrast, and outputs data of the adjusted target video to display 50. In this example, data of target video is supplied to video adjuster 14 from storage 13 provided in simulation device 20 but data of target video may be supplied to video adjuster 14 from an external video source without providing storage 13.

Figure 4:
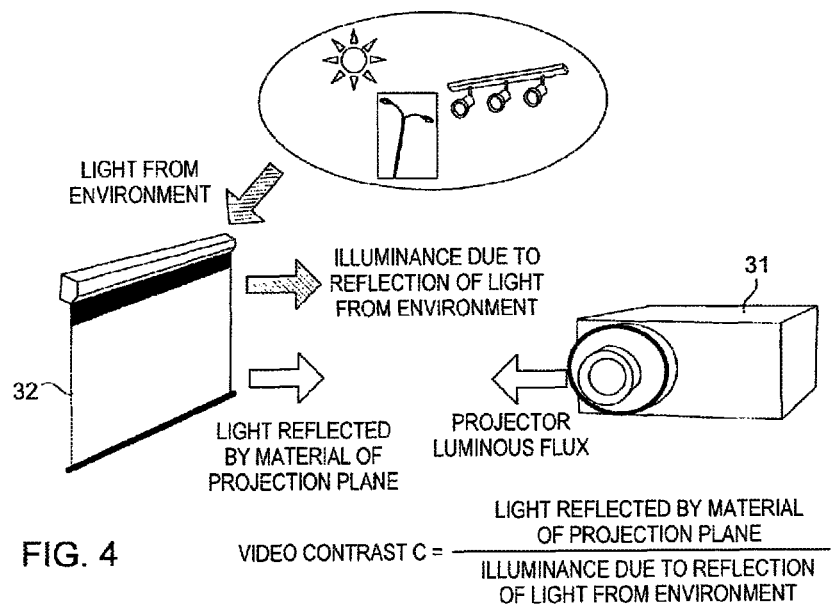
FIG. 4 is a diagram for description of calculation of a video contrast for a front-projection projector.
Figure 5:
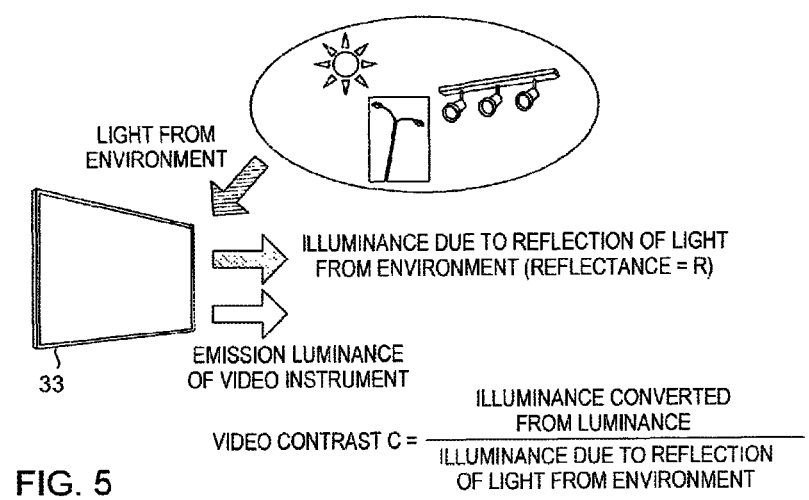
FIG. 5 is a diagram for description of calculation of a video contrast for a direct-view video instrument.

The following description of video contrast C will be made separately for each type of the video instrument. FIGS. 4 and 5 are each a diagram for description of video contrast C: FIG. 4 illustrates a case in which the video instrument is a front-projection projector, and FIG. 5 illustrates a case in which the video instrument is a liquid crystal display as a direct-view video instrument.

In a case of front-projection projector 31 illustrated in FIG. 4, the luminous flux of video from the projector is projected onto screen 32. Screen 32 is a front-type screen that reflects incident light in a diffusive manner. Screen 32 is also irradiated with various kinds of environmental light such as sun light, blue-sky light, indoor illumination light, and outdoor illumination light, and thus a viewer who is watching screen 32 simultaneously sees light of the video reflected by the material of a projection (in other words, screen 32) and light due to reflection of light from environment at the screen. In this case, video contrast C is defined as C=[light from the projector reflected by the material of the projection plane]/[illuminance due to reflection of light from environment].

As a specific example, when $\varphi$ represents the environmental illuminance, J represents a luminous flux specification value of projector 31, S represents the size of video formed on screen 32 by projector 31, F represents a flux attenuation rate in accordance with a lens shift amount of projector 31, $G_1$ represents a screen gain of screen 32 for projector 31, and $G_2$ represents a screen gain of screen 32 for environmental light,

[light from the projector reflected by the material of the projection plane]=$(J \times F) \times G_1/S$,

[illuminance due to reflection of light from environment]=$\varphi \times G_2$, and video contrast C can be expressed as $$C=(L \times G_1)/(S \times \varphi \times G_2) \quad (1).$$

In the expression, L represents the luminous flux of light from projector 31 on screen 32, and is expressed as L=J×F. Since the environmental light is typically incident on the screen at various angles, the screen gain $G_2$ can be set to one (1) for descriptive purposes.

In the case of a direct-view video instrument illustrated in FIG. 5, liquid crystal display 33 displays video at the emission luminance thereof, and simultaneously is irradiated with light from environment. Since the light from environment is reflected at the surface of liquid crystal display 33, a viewer who is watching liquid crystal display 33 sees light of video from liquid crystal display 33 and environmental light reflected at the surface of liquid crystal display 33. In this case, video contrast C is defined as C=[illuminance converted from the emission luminance of liquid crystal display 33]/[illuminance due to reflection of light from environment].

However, in this case, the surface of liquid crystal display 33 does not reflect the light of video from liquid crystal display 33, but reflects the environmental light, and thus reflectance $R_d$ of the surface of liquid crystal display 33 needs to be taken into consideration. As a specific example, the video contrast can be expressed as $$C=E/(\varphi \times R_d) \quad (2),$$

where $\varphi$ represents the environmental illuminance, and E represents the illuminance converted from the emission luminance of liquid crystal display 33.

Although not illustrated, video contrast C can be also defined by applying the same argument to a rear-projection video instrument. As a specific example, when the video instrument is a rear-projection projector and video from the projector is projected onto a transmissive screen, in other words, a rear-type screen that transmits incident light in a diffusive manner, the video contrast C can be expressed as $$C = (L \times G_3)/(S \times \varphi \times R_s) \quad (3),$$

where $\varphi$ represents the environmental illuminance, J represents the luminous flux specification value of the projector, S represents the size of video formed by the projector, F represents a flux attenuation rate in accordance with the lens shift amount of the projector, $G_3$ represents a screen gain of the rear-type screen, and $R_s$ represents the reflectance of the screen. Similarly to Eq. (1), L is expressed as L=J×F.

Specific examples of video contrast C have been explained above. Any of the various parameters used in the specific examples except for the environmental illuminance $\varphi$ are supplied to input unit 11 as the set condition. The various parameters used in these specific examples may be calculated from other parameters. For example, size S of video may be calculated based on, for example, the distance between the video instrument and the projection plane, the magnification of a projection lens, and the aspect ratio of video. When no lens shift function is available, F may be set to one.

Figure 6:
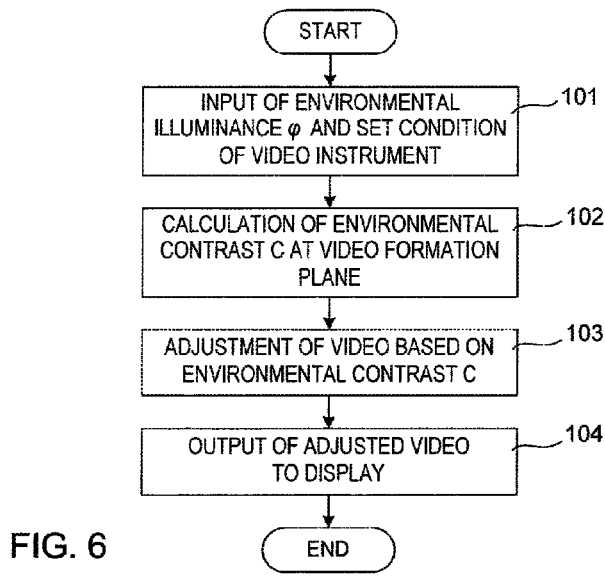
FIG. 6 is a flowchart illustrating operation of the simulation device illustrated in FIG. 3.

The following describes adjustment of the contrast of target video by video adjuster 14. Video adjuster 14 adjusts the contrast of target video in accordance with video contrast C and outputs the adjusted target video to display 50. As described above, since video contrast C is a parameter representing the actual appearance of output video from the video instrument, video adjuster 14 adjusts the contrast of the target video in accordance with video contrast C so that the appearance of the target video displayed on display 50 matches with the actual appearance of the target video assumed to be output from the video instrument as a simulation target. The contrast of the target video is adjusted by, for example, a method of superimposing (overlaying) a white raster image corresponding to environmental light onto the target video, and outputting the target video. In this method, a transparency is set to the white raster image in accordance with video contrast C and used to superimpose the white raster image onto the target video. Accordingly, the superimposed white raster image is more transparent as the video contrast is larger. The value of the transparency is set to be larger as the video contrast is larger. Examples of the kinds of the environmental light include sun light, blue-sky light, cloudy light, and illumination light, and the appearance of video from the video instrument potentially differs between the kinds of the environmental light, and thus an image having a color temperature equivalent to the color temperature of the environmental light in the viewing environment can be used as the white raster image. Alternatively, as the method of adjusting the contrast of the target video, a black level indicating the minimum luminance of the target video may be adjusted in accordance with video contrast C. In this case, the luminance value of the black level is set to be closer to a luminance indicated by the black level of original video as video contrast C is larger, and is set to be larger than the luminance indicated by the black level of original video as video contrast C is smaller FIG. 6 is a flowchart illustrating the above-described processing at simulation device 20 illustrated in FIG. 3. First at step 101, the environmental illuminance $\varphi$ in a viewing environment assumed for a video instrument and a set condition related to the video instrument are input to input unit 11. The set condition includes at least the optical output. Subsequently at step 102, video contrast calculator 12 calculates, by using the environmental illuminance $\varphi$ and the set condition, video contrast C based on a ratio between the illuminance of the output video and the environmental illuminance at a video formation plane on which output video from the video instrument is to be formed. The processing up to step 102 is same as the processing performed by simulation device 10 illustrated in FIG. 1. Subsequently at step 103, video adjuster 14 adjusts the contrast of target video read from storage 13 based on video contrast C, and then at step 104, video adjuster 14 outputs data of the adjusted target video to display 50.

Simulation device 20 according to the present exemplary embodiment calculates a video contrast based on the ratio between the illuminance of the output video and the environmental illuminance, adjusts the contrast of the target video based on the calculated video contrast, and outputs the target video to display 50. As a result, the target video displayed on display 50 is video that would appear when affected by environmental light. Accordingly, without bringing an actual video instrument to an actual use place, the user can check how output video from the video instrument appears under a predetermined environment. The use of simulation device 20 according to the present exemplary embodiment, for example, when the video instrument is a projector, allows desk simulation in advance of projected video from the projector, which changes depending on the viewing environment. The use of simulation device 20 eliminates the need to bring an actually used projector to an actual use place and actually check projected video from the projector, thereby achieving significant reduction in carriage cost, workforce cost, and temporal cost. In particular, simulation device 20 according to the present exemplary embodiment can largely contribute to the cost reduction as the size of a projector, video from which is to be checked, is larger. In addition, when no actually operational projector is available since it is a product being designed or manufactured, simulation device 20 allows checking of how video projected from the projector appears. The use of simulation device 20 allows logical presentation of a candidate projector that provides necessary brightness based on the appearance of video to a customer of the projector. Similarly, the use of simulation device 20 allows a required luminance of the video instrument to be simulated in advance when the video device is a direct-view video instrument such as a liquid crystal display or an LED screen.

Figure 7:
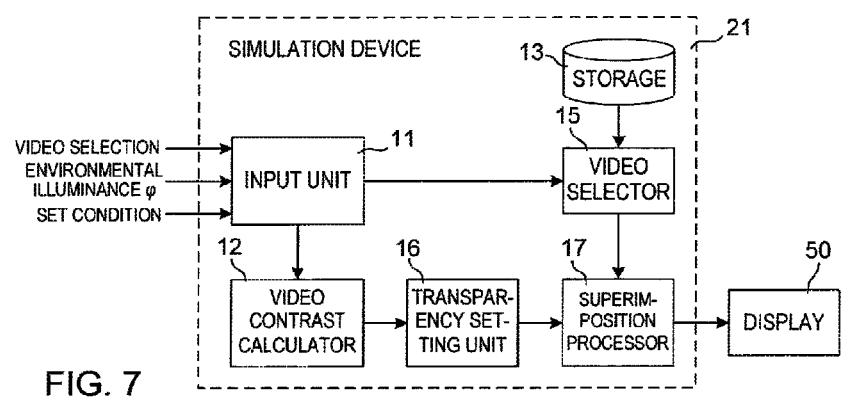
FIG. 7 is a block diagram illustrating the configuration of a simulation device according to another exemplary embodiment of the present invention.

In order to achieve simulation of the appearance of output video from the video instrument, target video as a simulation target is preferable video same as video to be output from the video instrument as a simulation target or video having a characteristic similar to that of the output video. For this reason, it is preferable that a plurality of video contents be prepared in advance to allow selection of target video from among the video contents. When, for example, easiness of performing the adjustment of the contrast of video is taken into consideration, a prepared video content is preferably a digital content. FIG. 7 illustrates another exemplary embodiment of the simulation device based on the present invention, which allows selection of target video from among a plurality of digital contents. Simulation device 21 illustrated in FIG. 7 is same as simulation device 20 illustrated in FIG. 3 except that simulation device 21 includes video selector 15 for the selection of target video, and in addition, transparency setting unit 16 and superimposition processor 17 corresponding to video processor 14 illustrated in FIG. 3, which is difference from the device illustrated in FIG. 3. The plurality of digital contents are stored in storage 13 as digital file M. Examples of the file format of the digital file include: a jpg file in a JPEG (Joint Photographic Experts Group) format and a png file in a PNG (Portable Network Graphics)

format for a still image; and a wmv file in a WMV (Windows® Media Video) format and a mov file in a QuickTime® format for a moving picture. Input unit 11 receives an input of instruction for video selection in addition to the environmental illuminance φ and the set condition.

Video selector 15 receives an instruction for video selection from input unit 11, and outputs digital file M of a video content corresponding to the instruction to superimposition processor 17. Transparency setting unit 16 sets a transparency to the white raster image in accordance with video contrast C, and video superimposing unit 17 superimposes the white raster image with the transparency set by transparency setting unit 16 onto digital file M of target video selected by video selector 15, and outputs digital file M to display 50. Simulation device 21 according to the present exemplary embodiment performs simulation of how output video from the video instrument appears by superimposing (overlaying) the white raster image (or moving picture) on the target video. The transparency set to the white raster image is smaller as video contrast C is smaller, but is larger as video contrast C is larger.

Figure 8:
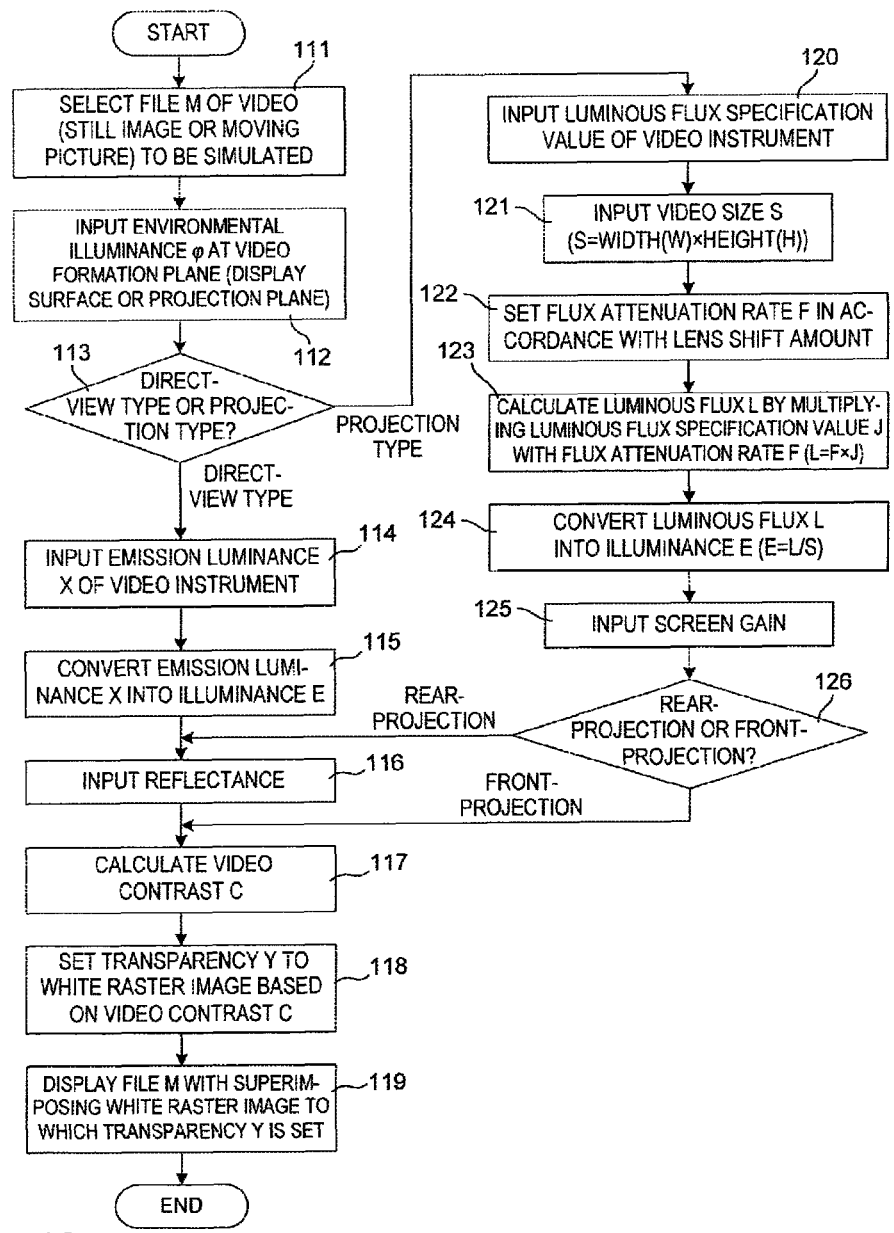
FIG. 8 is a flowchart illustrating operation of the simulation device illustrated in FIG. 7.

The following describes the processing performed by simulation device 21 illustrated in FIG. 7 with reference to a flowchart illustrated in FIG. 8. First at step 111, video as a simulation target, in other words, file M of target video is selected by inputting an instruction for video selection to input unit 11, and subsequently at step 112, the environmental illuminance φ at the video formation plane is input. The environmental illuminance φ may be directly input as a numerical value. As described later, simulation device 21 can be also achieved by executing software on a general-purpose computer, and in such a case, in order to facilitate the inputting of the environmental illuminance φ, explanation with pictures may be displayed on a display screen of the computer to prompt a user to select, for example, the layout environment of a building, a time, and weather so that the environmental illuminance φ may be set based on the selection by the user. In this case, a table indicating a typical environmental illuminance for each combination of the layout environment of a building, a time, and weather is prepared and searched based on the selection by the user to determine the environmental illuminance φ used for simulation. Subsequently at step 113, it is determined whether the video instrument as a simulation target is of a direct-view type or a projection type. Whether the video instrument is of a direct-view type or a projection type may be determined in advance or input through input unit 11.

In a case of the projection type, the process transitions to step 120 at which luminous flux specification value J of the video instrument is input through input unit 11, and video size S of viewed video on a projection plane such as a screen is input at step 121. Video size S is expressed as [width W of the viewed video]×[height H of the viewed video]. Width W can be expressed as the product of projection distance ratio T and projection distance D of the video instrument, and thus, for example, projection distance ratio T, projection distance D, and the aspect ratio of output video of the video instrument may be input in place of video size S. Following step 121, flux attenuation rate F is set in accordance with the lens shift amount of the video instrument at step 122, luminous flux L is calculated by multiplying luminous flux specification value J with flux attenuation rate F at step 123, and luminous flux L is converted into illuminance E at step 124. Luminous flux L is expressed as L=F×J, and illuminance E is calculated by dividing luminous flux L by video size S, in other words, calculated as E=L/S. Following the calculation of illuminance E, screen gains are input at step 125. The screen gains to be input are above-described screen gains $G_1$ and $G_2$ for a front-projection video instrument, or screen gain $G_3$ for a rear-projection video instrument. The screen gains may include correction with an attenuation rate in accordance with the angle of a viewer relative to the screen. When no lens shift function is available from the video instrument, steps 122 and 123 may be omitted. In this case, L=J holds.

After the inputting of the screen gains, it is determined whether the video instrument is of a rear-projection type or a front-projection type at step 126. Whether the video instrument is of a direct-view type or a projection type may be determined in advance or input through input unit 11. The process transitions to step 117 after reflectance $R_s$ of the screen is input at step 116 in a case of a rear-projection, or the process directly transitions from step 126 to step 117 in a case of a front-projection.

If it is determined that the video instrument is a direct-view video instrument at step 113, emission luminance X of the video instrument is input at step 114, and emission luminance X is converted into illuminance E at step 115. If each pixel of the video instrument can be recognized as a point light source that isotopically emits light, illuminance E is expressed as E=πX. Emission luminance X is converted into E based on the directionality of the video instrument as a light source. Thereafter, reflectance $R_d$ of the surface of the video instrument is input at step 116, and the process transitions to step 117.

At step 117, video contrast C is calculated by video contrast calculator 12. The calculation of video contrast C uses above-described Eq. (1) if the video instrument is of a front-projection type, Eq. (2) if the video instrument is of a direct-view type, or Eq. (3) if the video instrument is of a rear-projection type. After the calculation of video contrast C, subsequently at step 118, transparency setting unit 16 sets transparency Y to the white raster image based on video contrast C, and then at step 119, superimposition processor 17 superimposes the white raster image at transparency Y onto video of file M and outputs the video to display 50. Accordingly, display 50 displays a result of the simulation of the appearance of the video under the assumed viewing environment.

Figure 9:
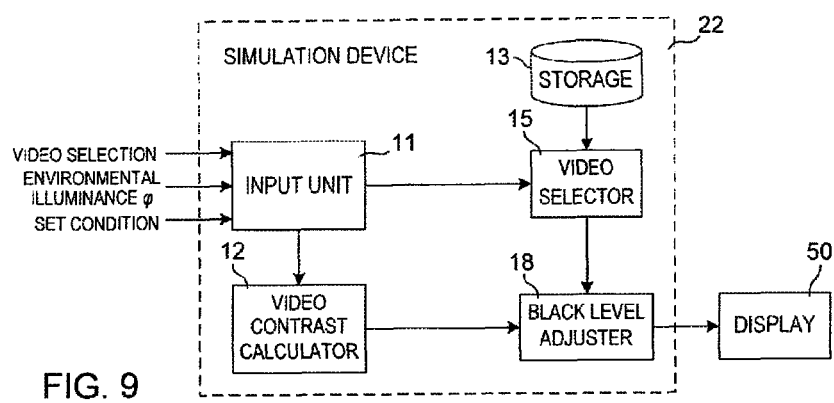
FIG. 9 is a block diagram illustrating the configuration of a simulation device according to still another exemplary embodiment of the present invention.

Simulation device 22 illustrated in FIG. 9 is same as simulation device 21 illustrated in FIG. 7 except that a method of changing the black level of the target image in accordance with video contrast C is used as the method of adjusting the contrast of target video in accordance with video contrast C, which is difference from simulation device 21 illustrated in FIG. 7. Accordingly, simulation device 22 illustrated in FIG. 9 includes black level adjuster 18 in place of transparency setting unit 16 and superimposition processor 17 in simulation device 21 illustrated in FIG. 7. Black level adjuster 18 corresponds to video adjuster 14 in simulation device 20 illustrated in FIG. 3. Black level adjuster 18 adjusts the target video by adjusting a black level indicating the minimum luminance of video in accordance with video contrast C, and outputs the target video subjected to the adjustment. The black level is set to be larger as video contrast C is smaller. In other words, the difference between the black level and a white level indicating the maximum luminance is reduced when video contrast C is small. As video contrast C is larger, however, the black level is more largely reduced. For example, when video has an integer value from 0 to 255 and is displayed at a gradation with a higher luminance as the value is larger, the video is compressed for low video contrast C so as to be displayed at gradation from 100 to 255, and then the target video is adjusted based on this gradation conversion. The video is adjusted to be displayed at gradation from 0 to 255 as video contrast C is higher.

Figure 10:
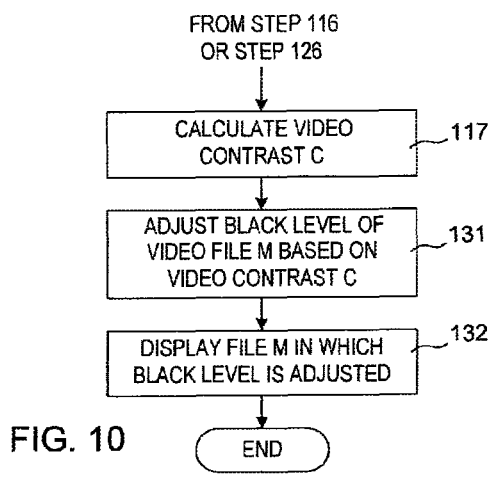
FIG. 10 is a flowchart illustrating operation of the simulation device illustrated in FIG. 9.

FIG. 10 illustrates processing performed by simulation device 22 illustrated in FIG. 9. Processing up to step 117, at which video contrast C is calculated, is identical to that of the flowchart illustrated in FIG. 8, and thus in FIG. 10, steps 111 to 116 and 120 to 126 are omitted. Upon the calculation of video contrast C at step 117, black level adjuster 18 adjusts the black level of video file M based on video contrast C and outputs video file M to display 50 at step 131. Accordingly, at step 132, video of file M, the black level of which is adjusted, is displayed on display 50 as a result of the simulation.

Simulation devices 21 and 22 illustrated in FIGS. 7 and 9 each allow a user to simulate and check how video from a video instrument as a simulation target appears under an assumed viewing environment by selecting, from the video instrument, a still image or a moving picture file to be displayed or projected. If the video instrument is of a projection type, characteristics (for example, a screen gain and a reflection characteristic) of a screen affect a result of the simulation. For this reason, in order to facilitate inputting of a set condition related to the characteristics of the screen, it is preferable to accumulate characteristic data of a plurality of typical screen products of popular manufacturers in advance, prompt the user to select a screen to be actually used from among the screen products, and automatically input a set condition related to the screen in response to a result of the selection.

The simulation devices according to the above-described exemplary embodiments are configured to perform processing in accordance with each of the front-projection type, the rear-projection type, and the direct-view type of a video instrument, but the simulation device based on the present invention is not limited thereto. The scope of the simulation device based on the present invention includes, for example, a device that performs simulation for a front-projection video instrument, a device that performs simulation for a rear-projection video instrument, a device that performs simulation for a direct-view video instrument, and a device that performs simulation for combination of a front-projection video instrument and a direct-view video instrument. The processing illustrated in FIG. 8 can be modified as appropriate to facilitate a request or usage of performing simulation for a video instrument of a particular type.

The simulation devices according to the above-described exemplary embodiments may be achieved by a computer including a microprocessor such as a CPU (central processing unit) and a peripheral circuit thereof. The simulation devices are achieved on the computer by causing the computer to read and execute a computer program configured to execute the functions of the above-described blocks such as input unit 11, video contrast calculator 12, and video adjuster 14. This computer program is read from an external device through a communication interface, for example, provided to the computer, or read from a computer-readable storage medium, and stored in a storage device for the computer program.

When the computer is used to achieve the simulation devices and connected to an external network, the simulation devices can calculate a brightness corresponding to each video contrast in accordance with a condition input by a user and can display information related to any product corresponding to the brightness or a hyperlink to a network site related to the product. If no product corresponding to a desired condition input by the user is available, the simulation devices can display that no corresponding product is available. The term "product" includes a video instrument and also any optional lens for the video instrument. In addition, the simulation devices may automatically connect a network site that produces an estimate sheet for purchase of the corresponding product, and produce and display an estimate sheet for the corresponding product. Accordingly, the simulation devices can present, through inputting of a desired video viewing condition by the user, an estimate sheet for a video instrument capable of displaying video at a certain video contrast and any accessory of the video instrument to the user.

The whole or part of the exemplary embodiments disclosed above can be described as, but not limited to, the following supplementary notes.

(Supplementary Note 1)

A method of simulating how output video from a video instrument that presents video appears under a given viewing environment, the method comprising:

inputting an environmental illuminance in a viewing environment in which the output video is viewed;

inputting a set condition with regard to the video instrument, the set condition including at least an optical output; and calculating and outputting, by using the environmental illuminance and the set condition, a video contrast based on a ratio between an illuminance of the output video and the environmental illuminance at a video formation plane on which the output video is formed.

(Supplementary Note 2)

The method according to Supplementary Note 1, further including: adjusting a contrast of target video displayed as the output video based on the output video contrast; and outputting data of the adjusted target video to a display.

(Supplementary Note 3)

The method according to Supplementary Note 2, wherein the adjusting of the contrast of the target video includes: setting transparency to a white raster image in accordance with the video contrast; and superimposing the white raster image at the set transparency onto the target video, and wherein a value of the transparency is set to be larger as the video contrast is larger.

(Supplementary Note 4)

The method according to Supplementary Note 3, wherein the white raster image is an image with a color temperature equivalent to a color temperature of environmental light in the viewing environment.

(Supplementary Note 5)

The method according to Note 2, wherein the adjusting of the contrast of the target video includes adjusting a black level of the target video in accordance with the video contrast, and a luminance value of the black level is set to be closer to a luminance indicated by the black level of the target video yet to be subjected to the adjustment as the video contrast is larger, and is set to be larger than the luminance indicated by the black level of the target video yet to be subjected to the adjustment as the video contrast is smaller.

(Supplementary Note 6)

The method according to any one of Supplementary Notes 2 to 4, wherein the target image is a digital content.

(Supplementary Note 7)

The method according to Supplementary Note 6, further including selecting the target image from among a plurality of digital contents.

(Supplementary Note 8)

The method according to any one of Notes 1 to 7, wherein the video instrument is a front-projection projector, the video formation plane is a projection plane onto which output video from the projector is projected, and the video contrast is obtained by dividing light from the projector reflected by the projection plane by an illuminance due to reflection of light from environment at the projection plane.

(Supplementary Note 9)

The method according to any one of Supplementary Notes 1 to 7, wherein the video instrument is a front-projection projector, the video formation plane is a front-type screen onto which output video from the projector is projected, and the video contrast, which is represented by C, is expressed as $$C=(J\times F\times G_1)/(S\times \varphi \times G_2)$$

where $\varphi$ represents the environmental illuminance, J represents a luminous flux specification value of the projector, S represents size of video formed by the projector, F represents a flux attenuation rate in accordance with a lens shift amount of the projector, $G_1$ represents a screen gain of the front-type screen for the projector, and $G_2$ represents a screen gain of the front-type screen for environmental light.

(Supplementary Note 10)

The method according to any one of Supplementary Notes 1 to 7, wherein the video instrument is a rear-projection projector, the video formation plane is a rear-type screen onto which output video from the projector is projected, and the video contrast, which is represented by C, is expressed as $$C=(J\times F\times G_3)/(S\times \varphi \times R_s)$$

where $\varphi$ represents the environmental illuminance, J represents a luminous flux specification value of the projector, S represents size of video formed by the projector, F represents a flux attenuation rate in accordance with a lens shift amount of the projector, $G_3$ represents a screen gain of the rear-type screen, and $R_s$ represents reflectance of the rear-type screen.

(Supplementary Note 11)

The method according to any one of Supplementary Notes 1 to 7, wherein the video instrument is a direct-view video instrument, and the video contrast is obtained by dividing an illuminance, which is acquired by converting an emission luminance of the video instrument, by an illuminance due to reflection of light from environment at a surface of the video instrument.

(Supplementary Note 12)

The method according to any one of Supplementary Notes 1 to 7, wherein the video instrument is a direct-view video instrument, the video formation plane is a surface of the video instrument, and the video contrast, which is represented by C, is expressed as $$C=E/(\varphi \times R_d)$$

where $\varphi$ represents the environmental illuminance, E represents an illuminance converted from an emission luminance of the video instrument, and $R_d$ represents reflectance of the surface.

(Supplementary Note 13)

The method according to any one of Supplementary Notes 1 to 7, wherein, when the video instrument is a front-projection projector, the video formation plane is a front-type screen onto which output video from the projector is projected, and the video contrast is expressed as $$C=(J\times F\times G_1)/(S\times \varphi \times G_2)$$

where $\varphi$ represents the environmental illuminance, C represents the video contrast, J represents a luminous flux specification value of the projector, S represents size of video formed by the projector, F represents a flux attenuation rate in accordance with a lens shift amount of the projector, $G_1$ represents a screen gain of the front-type screen for to the projector, and $G_2$ represents a screen gain of the front-type screen for environmental light.

(Supplementary Note 14)

The method according to any one of Supplementary Notes 1 to 7 and 13, wherein, when the video instrument is a rear-projection projector, the video formation plane is a rear-type screen onto which output video from the projector is projected, and the video contrast is expressed as $$C=(J\times F\times G_3)/(S\times \varphi \times R_s)$$

where $\varphi$ represents the environmental illuminance, C represents the video contrast, J represents a luminous flux specification value of the projector, S represents the size of video formed by the projector, F represents a flux attenuation rate in accordance with a lens shift amount of the projector, $G_3$ represents a screen gain of the rear-type screen, and $R_s$ represents reflectance of the rear-type screen.

(Supplementary Note 15)

The method according to any one of Supplementary Notes 1 to 7, 13 and 14, wherein, when the video instrument is a direct-view video instrument, the video formation plane is a surface of the video instrument, and the video contrast is expressed as $$C=E/(\varphi \times R_d)$$

where $\varphi$ represents the environmental illuminance, C represents the video contrast, E represents an illuminance converted from an emission luminance of the video instrument, and $R_d$ represents reflectance of the surface.

(Supplementary Note 16)

A simulation device that simulates how output video from a video instrument that presents video appears under a given viewing environment, the simulation device comprising:

an input unit that receives an environmental illuminance in a viewing environment in which the output video is viewed and a set condition with regard to the video instrument, the set condition including at least an optical output; and a video contrast calculator that calculates and outputs, by using the environmental illuminance and the set condition received by the input unit, a video contrast at a video formation plane on which output video from the video instrument is formed.

(Supplementary Note 17)

The simulation device according to Supplementary Note 16, further including a video adjuster that adjusts a contrast of target video displayed as the output video based on the video contrast, and outputs data of the adjusted target video to a display.

(Supplementary Note 18)

The simulation device according to Supplementary Note 17, wherein the target image is a digital content, and wherein the simulation device further including a video selector that selects the target image from among a plurality of digital contents, and outputs the selected target image to the video adjuster.

(Supplementary Note 19)

The simulation device according to Supplementary Note 17 or 18, wherein:

the video adjuster includes:
  a transparency setting unit that sets a transparency to a white raster image in accordance with the video contrast; and
  a video superimposing unit that superimposes the white raster image at the transparency set by the transparency setting unit onto the target video and outputs a result of the superimposition, and
  a value of the transparency is set to be larger as the video contrast is larger.

(Supplementary Note 20)

The simulation device according to Supplementary Note 19, wherein the video superimposing unit superimposes a white raster image having a color temperature equivalent to a color temperature of environmental light in the viewing environment.

(Supplementary Note 21)

The simulation device according to Supplementary Note 17 or 18, wherein:
  the video adjuster includes a black level adjuster that adjusts a black level indicating a minimum luminance of the target video in accordance with the video contrast and outputs the target video subjected to the adjustment, and
  a luminance value of the black level is set to be closer to a luminance indicated by the black level of the target video yet to be subjected to the adjustment as the video contrast is larger, and is set to be larger than the luminance indicated by the black level of the target video yet to be subjected to the adjustment as the video contrast is smaller.

(Supplementary Note 22)

The simulation method according to any one of Supplementary Notes 17 to 21, wherein the video instrument is a front-projection projector, the video formation plane is a projection plane onto which output video from the projector is projected, and the video contrast is obtained by dividing light from the projector reflected by the projection plane by an illuminance due to reflection of light from environment at the projection plane.

(Supplementary Note 23)

The simulation device according to any one of Supplementary Notes 17 to 21, wherein the video instrument is a front-projection projector, the video formation plane is a front-type screen onto which output video from the projector is projected, and the video contrast, which is represented by C, is expressed as $$C=(J\times F\times G_1)/(S\times \varphi \times G_2)$$

where $\varphi$ represents the environmental illuminance, J represents a luminous flux specification value of the projector, S represents the size of video formed by the projector, F represents a flux attenuation rate in accordance with a lens shift amount of the projector, $G_1$ represents a screen gain of the front-type screen for the projector, and $G_2$ represents a screen gain of the front-type screen for environmental light.

(Supplementary Note 24)

The simulation device according to any one of Supplementary Notes 17 to 21, wherein the video instrument is a rear-projection projector, the video formation plane is a rear-type screen onto which output video from the projector is projected, and the video contrast, which is represented by C, is expressed as $$C=(J\times F\times G_3)/(S\times \varphi \times R_s)$$

where $\varphi$ represents the environmental illuminance, J represents a luminous flux specification value of the projector, S represents size of video formed by the projector, F represents a flux attenuation rate in accordance with a lens shift amount of the projector, $G_3$ represents a screen gain of the rear-type screen, and $R_s$ represents reflectance of the rear-type screen.

(Supplementary Note 25)

The simulation device according to any one of Supplementary Notes 17 to 21, wherein the video instrument is a direct-view video instrument, and the video contrast is obtained by dividing an illuminance, which is acquired by converting an emission luminance of the video instrument, by an illuminance due to reflection of light from environment at a surface of the video instrument.

(Supplementary Note 26)

The simulation device according to any one of Supplementary Notes 17 to 21, wherein the video instrument is a direct-view video instrument, the video formation plane is a surface of the video instrument, and the video contrast, which is represented by C, is expressed as $$C=E/(\varphi\times R_d)$$

where $\varphi$ represents the environmental illuminance, E represents an illuminance converted from an emission luminance of the video instrument, and $R_d$ represents reflectance of the surface.

(Supplementary Note 27) The simulation device according to any one of Supplementary Notes 17 to 21, wherein, when the video instrument is a front-projection projector, the video formation plane is a front-type screen onto which output video from the projector is projected, and the video contrast is expressed as $$C=(J\times F\times G_1)/(S\times \varphi \times G_2)$$

where $\varphi$ represents the environmental illuminance, C represents the video contrast, J represents a luminous flux specification value of the projector, S represents size of video formed by the projector, F represents a flux attenuation rate in accordance with a lens shift amount of the projector, $G_1$ represents a screen gain of the front-type screen for the projector, and $G_2$ represents a screen gain of the front-type screen for environmental light.

(Supplementary Note 28)

The simulation device according to any one of Supplementary Notes 17 to 21 and 27, wherein, when the video instrument is a rear-projection projector, the video formation plane is a rear-type screen onto which output video from the projector is projected, and the video contrast is expressed as $$C=(J\times F\times G_3)/(S\times \varphi \times R_s)$$

where $\varphi$ represents the environmental illuminance, C represents the video contrast, J represents a luminous flux specification value of the projector, S represents the size of video formed by the projector, F represents a flux attenuation rate in accordance with a lens shift amount of the projector, $G_3$ represents a screen gain of the rear-type screen, and $R_s$ represents reflectance of the rear-type screen.

(Supplementary Note 29)

The simulation device according to any one of Supplementary Notes 17 to 21, 27, and 28, wherein, when the video instrument is a direct-view video instrument, the video formation plane is a surface of the video instrument, and the video contrast is expressed as $$C=E/(\varphi\times R_d)$$

where $\varphi$ represents the environmental illuminance, C represents the video contrast, E represents an illuminance converted from an emission luminance of the video instrument, and $R_d$ represents the reflectance of the surface.

(Supplementary Note 30)

A computer program that simulates how output video from a video instrument that presents video appears under a given viewing environment, the computer program being configured to cause a computer to function as:

an input unit that receives an environmental illuminance in a viewing environment in which the output video is viewed and a set condition with regard to the video instrument, the set condition including at least an optical output; and a video contrast calculator that calculates and outputs, by using the environmental illuminance and the set condition received by the input unit, a video contrast at a video formation plane on which the output video is formed.

(Supplementary Note 31)

The computer program according to Supplementary Note 30 that causes the computer to further function as a video adjuster that adjusts a contrast of target video displayed as the output video based on the video contrast and outputs data of the adjusted target video to a display.

REFERENCE SIGNS LIST 10, 20 to 22 simulation device
11 input unit
12 video contrast calculator
13 storage
14 video adjuster
15 video selector
16 transparency setting unit
17 superimposition processor
18 black level adjuster
31 projector
32 screen
33 liquid crystal display
50 display

The invention claimed is:

1. A method of simulating how an output video from a video instrument that presents video appears under a given viewing environment, the method comprising:
   inputting an environmental illuminance in a viewing environment in which the output video is viewed;
   inputting a set condition with regard to the video instrument, the set condition including at least an optical output;
   calculating and outputting, by using the environmental illuminance and the set condition, a video contrast based on a ratio between an illuminance of the output video and the environmental illuminance at a video formation plane on which the output video is formed;
   adjusting a contrast of a target video displayed as the output video based on the output video contrast; and
   outputting data of the adjusted target video to a display,
   wherein the optical output is an output of the video instrument,
   wherein the adjusting of the contrast of the target video includes setting a transparency to a white raster image in accordance with the video contrast, and
   wherein the adjusting of the contrast of the target video further includes superimposing the white raster image at the set transparency onto the target video.

2. The method according to claim 1, wherein a value of the transparency is set to be larger as the video contrast is larger.

3. The method according to claim 1, wherein, when the video instrument comprises a front-projection projector, the video formation plane comprises a front-type screen onto which an output video from the projector is projected, and the video contrast is expressed as $$C=(J \times F \times G_1)/(S \times \varphi \times G_2)$$

where $\varphi$ represents the environmental illuminance, C represents the video contrast, J represents a luminous flux specification value of the projector, S represents a size of video formed by the projector, F represents a flux attenuation rate in accordance with a lens shift amount of the projector, $G_1$ represents a screen gain of the front-type screen for the projector, and $G_2$ represents a screen gain of the front-type screen for environmental light.

4. The method according to claim 1, wherein, when the video instrument comprises a direct-view video instrument, the video formation plane comprises a surface of the video instrument, and the video contrast is expressed as $$C=E/(\varphi \times R_d)$$

where $\varphi$ represents the environmental illuminance, C represents the video contrast, E represents an illuminance converted from an emission luminance of the video instrument, and $R_d$ represents a reflectance of the surface.

5. A simulation device that simulates how an output video from a video instrument that presents video appears under a given viewing environment, the simulation device comprising:
   an input unit that receives an environmental illuminance in a viewing environment in which the output video is viewed and a set condition with regard to the video instrument, the set condition including at least an optical output;
   a video contrast calculator that calculates and outputs, by using the environmental illuminance and the set condition received by the input unit, a video contrast based on a ratio of the illuminance of the output video and the environmental illuminance at a video formation plane on which the output video is formed; and
   a video adjuster that adjusts a contrast of a target video displayed as the output video based on the video contrast and outputs data of the adjusted target video to a display,
   wherein the optical output is an output of the video instrument, and
   wherein the video adjuster includes:
      a transparency setting unit that sets a transparency to a white raster image in accordance with the video contrast; and
      a video superimposing unit that superimposes the white raster image at the transparency set by the transparency setting unit onto the target video.

6. The simulation device according to claim 5,
   wherein the video superimposing unit outputs a result of the superimposition, and
   wherein a value of the transparency is set to be larger as the video contrast is larger.

7. The simulation device according to claim 5, wherein the video adjuster includes a black level adjuster that adjusts a black level indicating a minimum luminance of the target video in accordance with the video contrast and outputs the target video subjected to the adjustment, and
   wherein a luminance value of the black level is set to be closer to a luminance indicated by the black level of the target video yet to be subjected to the adjustment as the video contrast is larger, and is set to be larger than the luminance indicated by the black level of the target video yet to be subjected to the adjustment as the video contrast is smaller.

8. A non-transitory computer-readable recording medium that stored a computer program that simulates how an output video from a video instrument that presents video appears under a given viewing environment, wherein the computer program is configured to cause a computer to function as:
- an input unit that receives an environmental illuminance in a viewing environment in which the output video is viewed and a set condition with regard to the video instrument, the set condition including at least an optical output;
- a video contrast calculator that calculates and outputs, by using the environmental illuminance and the set condition received by the input unit, a video contrast based on a ratio of the illuminance of the output video and the environmental illuminance at a video formation plane on which the output video is formed; and
- a video adjuster that adjusts a contrast of a target video displayed as the output video based on the video contrast and outputs data of the adjusted target video to a display,
- wherein the optical output is an output of the video instrument, and
- wherein the video adjuster includes:
  - a transparency setting unit that sets a transparency to a white raster image in accordance with the video contrast; and
  - a video superimposing unit that superimposes the white raster image at the transparency set by the transparency setting unit onto the target video.

9. The method according to claim 2, wherein the white raster image comprises an image with a color temperature equivalent to a color temperature of environmental light in the viewing environment.

10. The method according to claim 1, wherein the adjusting of the contrast of the target video includes adjusting a black level of the target video in accordance with the video contrast, and a luminance value of the black level is set to be closer to a luminance indicated by the black level of the target video yet to be subjected to the adjustment as the video contrast is larger, and is set to be larger than the luminance indicated by the black level of the target video yet to be subjected to the adjustment as the video contrast is smaller.

11. The method according to claim 1, wherein the target image comprises a digital content.

12. The method according to claim 11, further including selecting the target image from among a plurality of digital contents.

13. The method according to claim 1, wherein the video instrument comprises a rear-projection projector, the video formation plane comprises a rear-type screen onto which output video from the projector is projected, and the video contrast, which is represented by C, is expressed as $$C=(J \times F \times G_3)/(S \times \varphi \times R_s)$$

where $\varphi$ represents the environmental illuminance, J represents a luminous flux specification value of the projector, S represents a size of video formed by the projector, F represents a flux attenuation rate in accordance with a lens shift amount of the projector, $G_3$ represents a screen gain of the rear-type screen, and $R_s$ represents a reflectance of the rear-type screen.

14. The method according to claim 1,
wherein, when the video instrument comprises a front-projection projector, the video formation plane comprises a front-type screen onto which output video from the projector is projected, and the video contrast is expressed as $$C=(J \times F \times G_1)/(S \times \varphi \times G_2)$$

where $\varphi$ represents the environmental illuminance, C represents the video contrast, J represents a luminous flux specification value of the projector, S represents a size of video formed by the projector, F represents a flux attenuation rate in accordance with a lens shift amount of the projector, $G_1$ represents a screen gain of the front-type screen for to the projector, and $G_2$ represents a screen gain of the front-type screen for environmental light.

15. The method according to claim 14, wherein, when the video instrument is a direct-view video instrument, the video formation plane includes a surface of the video instrument, and the video contrast is expressed as $$C=E/(\varphi \times R_d)$$

where E represents an illuminance converted from an emission luminance of the video instrument, and $R_d$ represents a reflectance of the surface.

16. The method according to claim 15, wherein, when the video instrument comprises a rear-projection projector, the video formation plane comprises a rear-type screen onto which output video from the projector is projected, and the video contrast is expressed as $$C=(J \times F \times G_3)/(S \times \varphi \times R_s)$$

where $G_3$ represents a screen gain of the rear-type screen, and $R_s$ represents a reflectance of the rear-type screen.

17. The simulation device according to claim 5, wherein the target image includes a digital content, and
wherein the simulation device further including a video selector that selects the target image from among a plurality of digital contents, and outputs the selected target image to the video adjuster.

* * * * *